April 8, 1952 B. E. GETZ 2,592,269
AGRICULTURAL CUTTING AND PROCESSING MACHINE ASSEMBLY
Filed July 26, 1949 5 Sheets-Sheet 1

Inventor
Benjamin E. Getz
by The Firm of Charlesworth Hills Attys

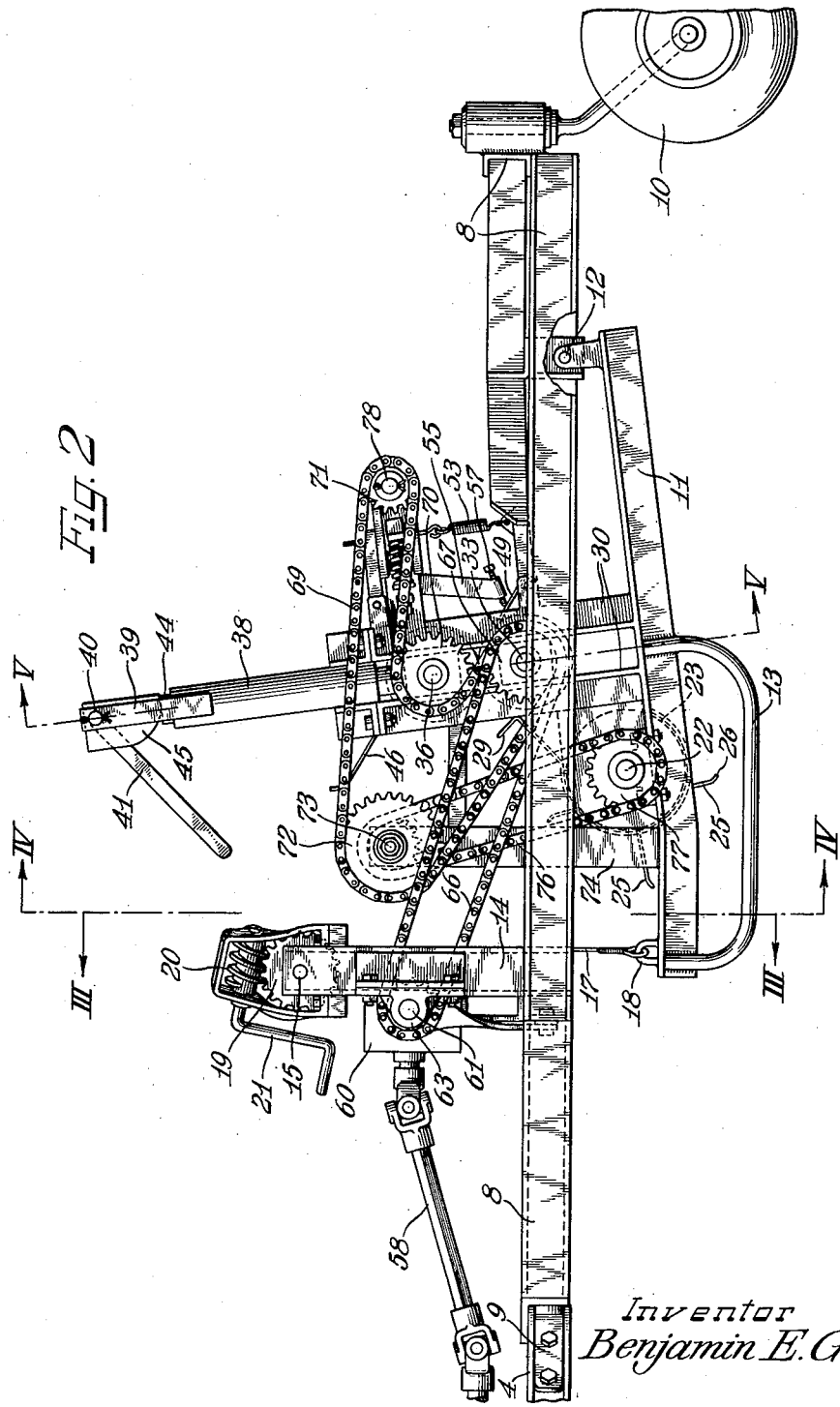

April 8, 1952 B. E. GETZ 2,592,269
AGRICULTURAL CUTTING AND PROCESSING MACHINE ASSEMBLY
Filed July 26, 1949 5 Sheets-Sheet 3
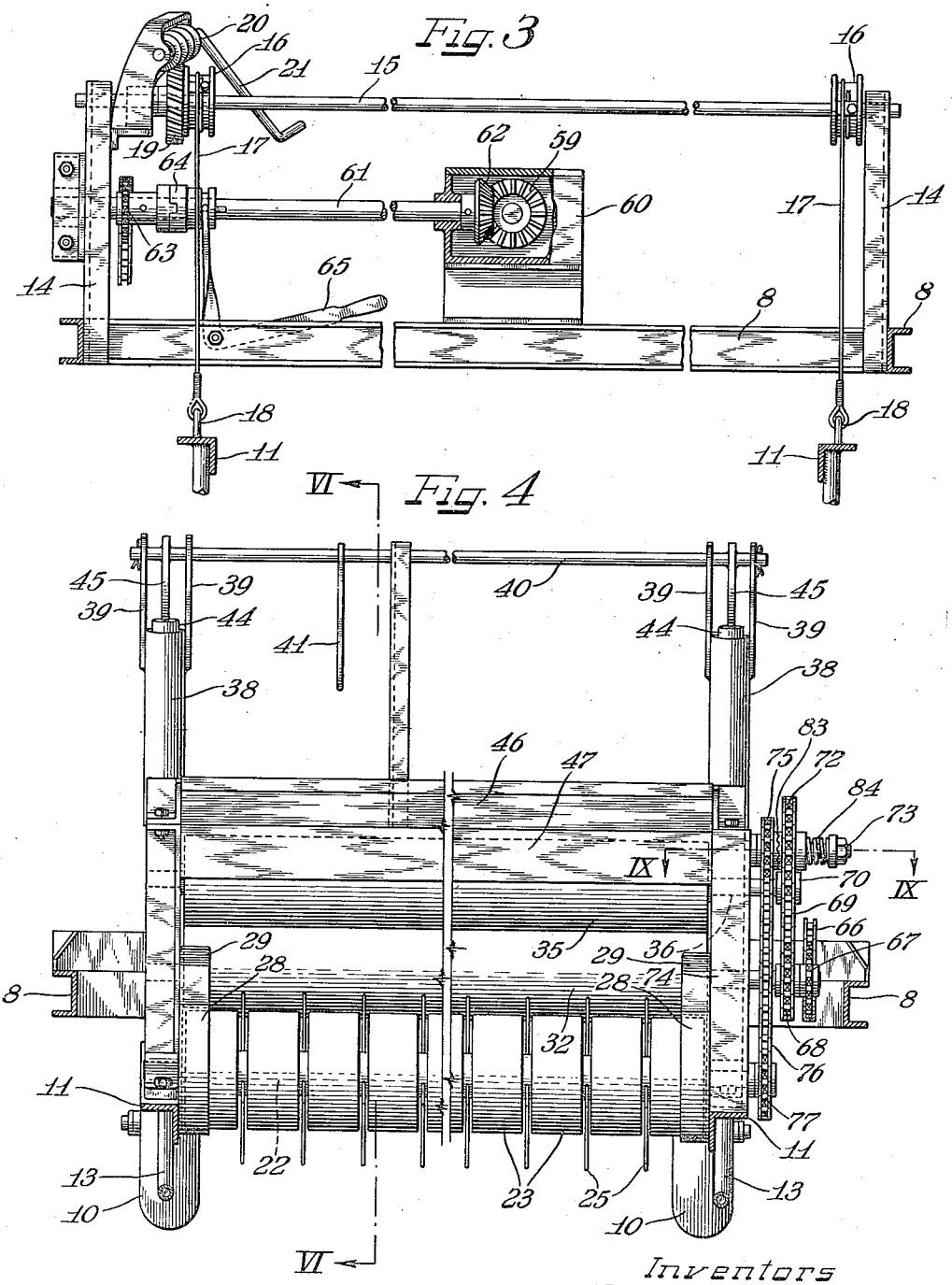
Inventors
Benjamin E. Getz
by The Firm of Charlesowhills Attys

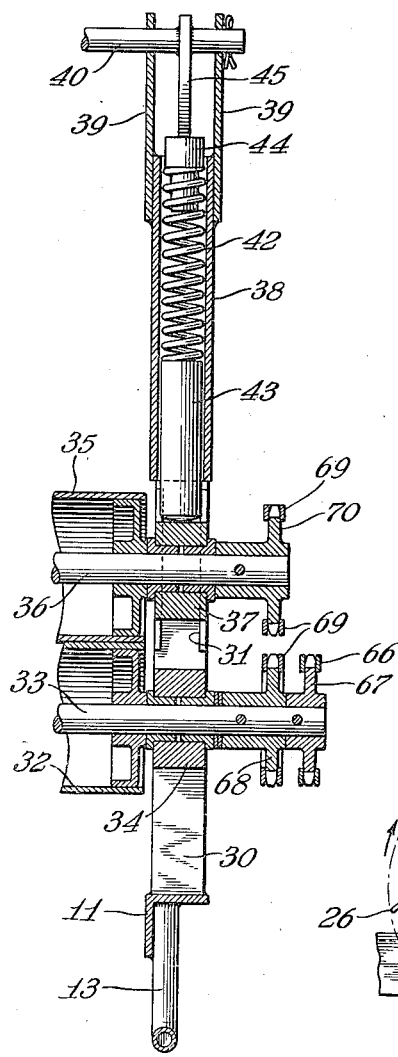
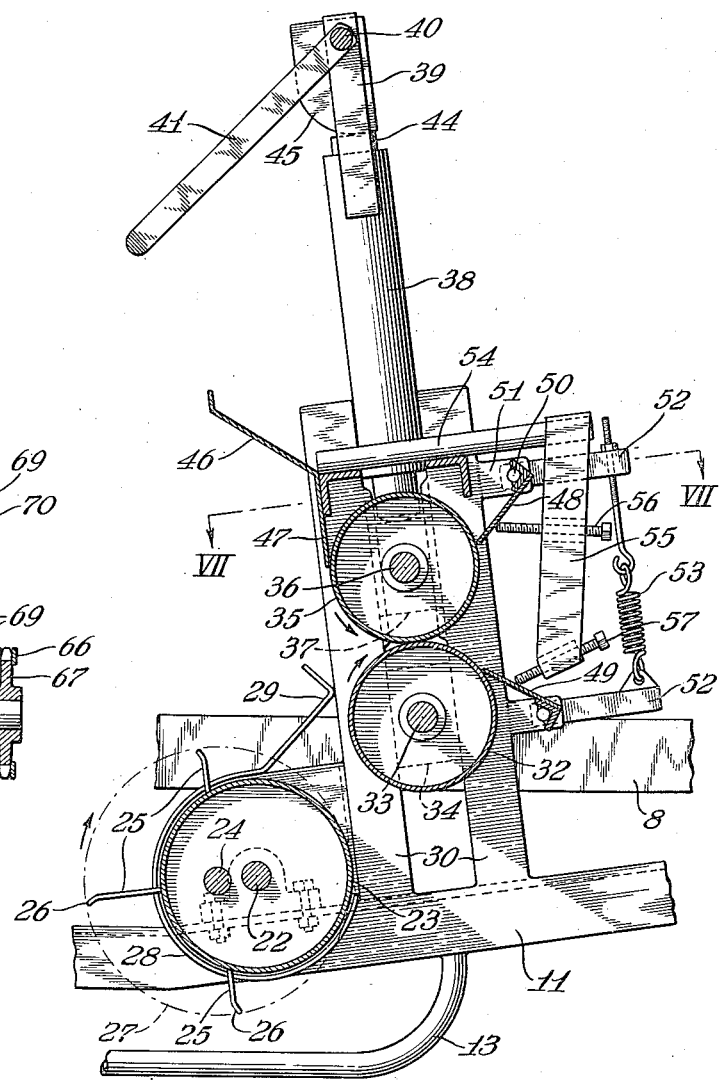

April 8, 1952 B. E. GETZ 2,592,269
AGRICULTURAL CUTTING AND PROCESSING MACHINE ASSEMBLY
Filed July 26, 1949 5 Sheets-Sheet 5
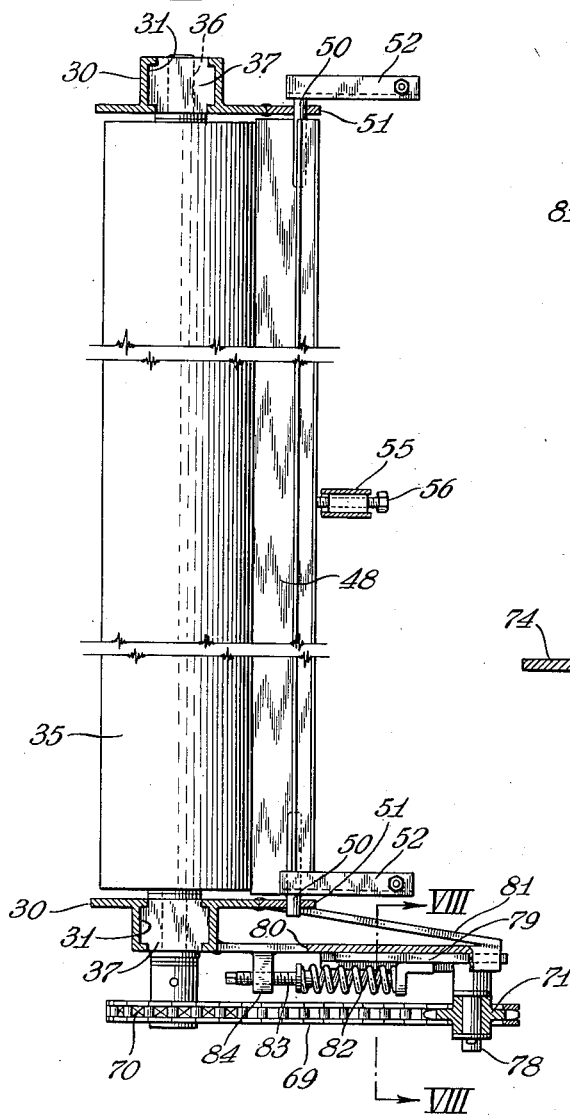
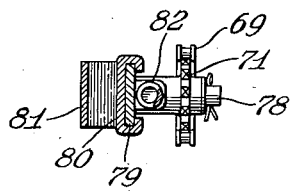
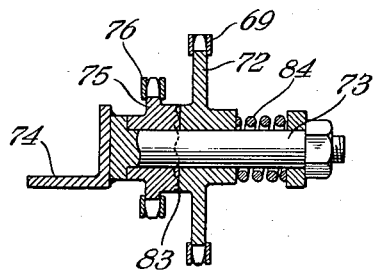
Inventor
Benjamin E. Getz Patented Apr. 8, 1952

2,592,269

UNITED STATES PATENT OFFICE 2,592,269

AGRICULTURAL CUTTING AND PROCESSING MACHINE ASSEMBLY

Benjamin E. Getz, Morton, Ill., assignor to A. F. Meyer Mfg. Co., Morton, Ill., a corporation of Illinois Application July 26, 1949, Serial No. 106,864

5 Claims. (Cl. 56—1)

This invention relates to improvements in an agricultural cutting and processing machine assembly for processing hay and the like, and more particularly to mechanism for connection with a power vehicle to cut, crush, and ted hay and similar agricultural products all in a continuous operation, although the invention may have other uses and purposes as will be apparent to one skilled in the art.

At the outset, it should be understood that while the instant invention herein will be disclosed and described in connection with the cutting and processing of hay for purposes of convenience and clarity, the apparatus is obviously capable of acting upon various other agricultural products that may be mowed and dried before actual removal from the field.

In the past, objectionable difficulty has been experienced by farmers in the proper harvesting of hay, especially where it is desired to first mow the hay, and then leave it lying in the field to be sun dried or cured. The farmers take the risk of rain, and when mowed hay has been wetted, it is necessary that another operation be performed, namely tedding the hay in an endeavor to ultimately get it properly dried or cured. Nothing satisfactory of which I am aware has ever been provided heretofore that would effectively hasten the drying time of the hay. Also, in the past, many and various types of mowing machines have been provided, including mowing decives for connection to a power vehicle such as a tractor. Merely mowing is all those devices accomplish, however. In the use of mowing devices of the character heretofore known, while the mowing elements were cutting one swath, the power vehicle and anything else that might be connected to it was running over the previous cut swath, and in the only crushing machine of which I am aware the tractor ran over that previously cut and processed swath, thus compacting the mowed hay and crushing it down close to the ground, thereby adding to the difficulty and length of time required for drying. Not any of these formerly known devices did anything at all in the nature of processing the hay and leaving all of it undisturbed and in a loose, fluffy condition on the ground for drying.

With the foregoing in mind, it is an important object of the instant invention to provide a processing apparatus which may be rigidly coupled with a mowing mechanism for the purpose of processing hay contemporaneously with the mowing thereof to materially shorten the natural drawing time.

Another object of this invention is the provision of apparatus which may be integrally associated with mowing means for contemporaneously crushing hay contemporaneously with the mowing of the hay, especially the stocks or stems of the hay.

It is also a feature of this invention to provide apparatus designed to ted hay contemporaneously with the mowing thereof to shorten the drying time.

Still a further feature of this invention resides in the provision of agricultural cutting and processing apparatus designed to cut hay and the like and contemporaneously therewith crush and ted the hay, the device acting on the hay in the adjacent swath to that being cut.

It is also a feature of this invention to provide processing apparatus for use in conjunction with mowing means to contemporaneously process the hay along with the cutting thereof and eliminate any possibility of cut hay remaining compacted and pressed closely to the ground by a vehicle passing thereover during the mowing of a field.

Another feature of this invention resides in the provision of combined apparatus for attachment to a power vehicle, and capable of cutting a swath of hay and at the same time acting on the hay in the previously cut swath to both crush that hay and scatter it lightly and loosely upon the ground in the manner of a tedder to materially hasten the drying of the hay.

It is also an object of this invention to provide a processing apparatus rigidly connected to an agricultural mower so both may function together as a unit and be attached as a unit to a power vehicle, the processing apparatus following in line behind the power vehicle and acting upon the swath adjacent that being cut by the mowing means.

Further, it is an object of this invention to provide a processing apparatus which may be combined with mowing means to process hay contemporaneously with its cutting in a manner to lessen the natural drying time of the hay by substantially one-half, and in many cases even more.

While some of the more salient features, characteristics and advantages of the instant invention have been above pointed out, others will become apparent from the following disclosures, taken in conjunction with the accompanying drawings, in which:

Figure 2 is an enlarged fragmentary side elevational view of the processing apparatus of Fig. 1;

Figure 3 is a fragmentary transverse vertical sectional view on an enlarged scale, with parts broken away, taken substantially as indicated by the line III—III of Fig. 2, looking in the direction of the arrows;

Figure 4 is also a fragmentary transverse vertical sectional view on an enlarged scale taken substantially as indicated by the line IV—IV of Fig. 2;

Figure 5 is an enlarged fragmentary vertical sectional view taken substantially as indicated by the line V—V of Fig. 2, illustrating the mounting of the rolls in the processing apparatus;

Figure 6 is an enlarged fragmentary vertical sectional view taken longitudinally of the processing apparatus substantially as indicated by the line VI—VI of Fig. 4;

Figure 7 is a fragmentary plan sectional view taken substantially as indicated by the line VII—VII of Fig. 6;

Figure 8 is a transverse vertical sectional view taken substantially as indicated by the line VIII—VIII of Fig. 7, illustrating a structural detail, namely the mounting of the tension sprocket in the drive arrangement; and Figure 9 is an enlarged fragmentary plan sectional view taken substantially as indicated by the line IX—IX of Fig. 4.

As shown on the drawings:

Figure 1:
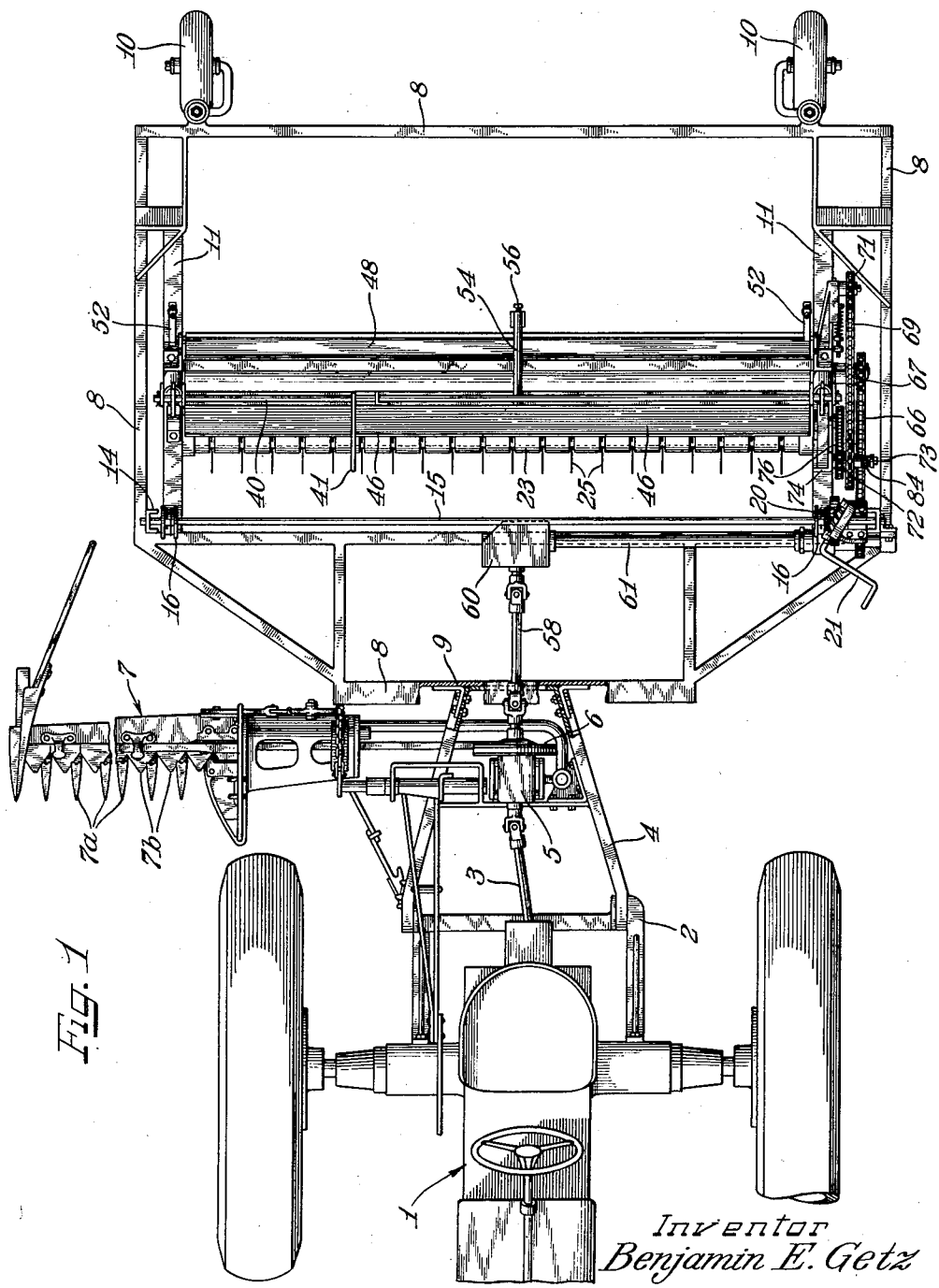
Figure 1 is a fragmentary plan view of a power vehicle in the form of a tractor to which is connected as a unit mowing means and processing apparatus embodying principles of the instant invention.

With reference to Fig. 1, it will be seen that the illustrated embodiment of the instant invention is shown in operative association with a power vehicle in the form of a tractor generally indicated by numeral 1. This tractor is provided with the usual draw bar arrangement 2 and a power takeoff visually exemplified by a telescopic shaft and universal joint assembly 3.

Pivotally connected to the drawbar arrangement 2, for up and down relative movement, is the frame 4 of a mowing or cutting mechanism, which is of known construction, and embodies a gear box 5 and drive wheel 6 connected to the shaft assembly 3 to be driven from the tractor takeoff. A cutter bar assembly generally indicated by numeral 7 extends laterally to one side of the tractor and includes the usual guard members 7a with which reciprocating knife blades 7b are associated, the reciprocation of which is effected by an eccentric connection with the drive wheel 6. In this assembly, a cutter bar assembly floats independently of the tractor, to one side thereof, and is especially suitable for cutting over uneven ground.

Previously, where such a mowing arrangement has been connected to a tractor, it has been usual to employ a caster wheel mounting at the rear end of the frame 4. That was because the mower was all that was connected to the tractor, and a rear rotary support was deemed desirable.

In the present instance, however, where processing apparatus is integrally joined with the mower, the frame 4 has been foreshortened, the caster wheel eliminated, and the forward part of a main frame 8 for the processing apparatus is welded, bolted, or equivalently secured directly to the foreshortened frame 4 of the cutting mechanism as indicated at 9 in Fig. 1. Thus processing apparatus and the cutting mechanism are joined together to all intents and purposes as an integral unit and may be treated as a unit when connecting and disconnecting the entire cutting and processing assembly to and from the tractor by virtue of the combined draw-bar structure. It will be understood that the main frame 8 is formed of various channel and angle irons welded or equivalently secured together at meeting points, and it is not necessary herein to enter into a specific description of the details of construction of such frame.

The rear end of the main frame 8 of the processing apparatus is preferably supported on each side thereof with a trailing caster wheel 10, as clearly seen in Figs. 1, 2 and 4.

With reference more particularly to Figs. 1, 2 and 3, it will be seen that the main frame 8 carries an underslung subframe 11 which is pivotally connected at each side of the rear end thereof to the subframe as indicated at 12 in Fig. 2. The side rails of this subframe 11 normally slope forwardly and downwardly, and each of these side rails is preferably provided with a ground skid 13 in the form of a U-shaped pipe or the equivalent and which ground skids prevent dropping the subframe too great a distance, and which effectively support the subframe in operative position when it is lowered to its maximum extent.

Elevating adjustment means are provided for the subframe 11 and these means, of course, are carried by the main frame 8. As seen best in Figs. 2 and 3, a pair of uprights 14—14 are secured to the main frame 8 and at their upper ends support a cross shaft 15. At each end thereof this shaft carries a pulley 16 to which one end of a cable 17 is fixed, the other end of the cable being connected to an eye on the front end of the subframe 11 as indicated at 18. Near one end thereof the shaft 15 also carries a worm wheel 19 fixed to the shaft and in mesh with a drive worm 20 actuated by a manually operable handle 21 which may be locked in a suitable position of adjustment by any desirable means. The operator need simply rotate the handle 21 in the proper direction to either elevate or lower the subframe 11 when desired.

Hay elevating means designed to pick up mowed hay from the ground are also carried by the subframe 11. These means which are only diagrammatically illustrated herein are preferably in the from of a rotary rake as best seen in Figs. 2, 4 and 6. These means are of the same construction as set forth in George Innes U. S. Letters Patent No. 2,133,143, issued October 11, 1938. Journaled in suitable bearing blocks on the subframe 11 is a cross shaft 22. This shaft carries a plurality of spaced hollow drum segments 23. A second cross shaft 24 (Fig. 6) extends parallel to shaft 22 and extends through these drum segments, but is eccentrically disposed in relation to the drum segments. This second shaft 24 is driven in any suitable manner from the shaft 22 and carries a series of spaced rake elements each of which comprises a plurality of spaced tines 25, each tine preferably having the end portion thereof turned rearwardly as indicated at 26 in Fig. 6. Each set of tines 25 is disposed in the space between adjacent drum segments as clearly seen in Figs. 1 and 4. Owing to the eccentric disposition of the rake or tine shaft 24, the tines 25 will operate through a circle of operation indicated by numeral 27 in Fig. 6. Thus, each tine 25 will project outwardly from the surface of the drum segments 23 variable distances during each revolution, the tine being substantially flush with the drum surfaces when extending rearwardly, gradually increasing to a maximum extent through the forward 180° of rotation, and then gradually decreasing to the minimum extent through the next 180° of rotation. Therefore, as each tine engages mowed hay upon the ground, it will first engage that hay with a lesser extent beyond the drum surfaces, and gradually increases its extent from those surfaces to better grip the hay as the tine moves upwardly and forwardly so as to insure adequate elevation of the hay. After the tine passes the midpoint where it is at its greatest extent, it gradually recedes into the drum surfaces in order to effect a quick and positive release of the hay so picked up. In the illustrated instance there are four equally spaced tines shown upon each rake element, but it will be understood that the number of tines may be varied depending upon the exigencies of circumstances.

Adjacent each end of the rotary rake structure, is a semi-circular guard 28 terminating at its upper end in a rearwardly sloping and forwardly bent portion 29, the function of these guards being to prevent hay being thrown or dropped between the frame and the end drum segments and immediately adjacent the bearings for the shaft 22.

Hay picked or thrown upwardly by the action of the rotary rake structure just above described, is delivered by that structure to crushing means now about to be described. With reference more particularly to Figs. 2, 5, 6 and 7, it will be seen that a pair of frame members 30 extends generally upwardly from each side of the subframe 11. These members are so arranged as to define an open channel 31 therebetween as clearly seen in Fig. 7. These channels 31—31 accommodate bearings for the shafts of crushing rolls. In the illustrated instance two such rolls are shown, including a lower roll 32 carried on a shaft 33 journaled in fixed bearings 34—34, these bearings being locked in position in the respective channels 31—31. An upper roll 35 is carried on a shaft 36 which is journaled in floating bearings 37—37, which bearings may move up and down within the channels 31—31.

The upper roll 35 is preferably resiliently urged to contact with the lower roll 32. The means for applying pressure to this upper roll are illustrated more clearly in Figs. 2, 4, 5 and 6. These means include a cylinder 38 fixedly carried on the upper end of each upstanding frame assembly 30. Each cylinder 38 is provided with a pair of upwardly projecting members 39—39, which members journal a cross shaft 40 that may be manually oscillated by means of a hand lever 41. In each cylinder 38 is a compression spring 42, the lower end of which bears against a plunger 43 contacting the respective bearing 37. The upper end of the spring is secured to a plunger type rider 44 in engagement with a cam 45 fixed to the shaft 40. It will therefore be apparent that when a load is passed between the crusher rolls 36 and 32 variations in the loads are compensated for by a slight up and down movement of the upper roll 36 against the action of the springs 42—42. In the event a sudden overload or jamming occurs, it is a simple expedient for the operator to move the handle 41, actuate the cams 45—45 and release the pressure on the upper roll sufficient to clear any jamming or sudden overload. A movement of the handle in the opposite direction, of course, restores the pressure upon the upper roll.

In order to prevent hay being thrown above the set of crushing rolls by the rotary rake above described, a baffle or deflector 46 (Figs. 2, 4 and 6) projects forwardly and upwardly from the cross members on the roll frame 30, and this member has a skirt 47 extending downwardly substantially into contact with the upper roll 36 so as to prevent material being tossed over the upper surface of this roll.

On the rearward side of the crusher rolls scraper means are provided to maintain the rolls in a clean condition and prevent long strands of hay or other material from winding around the rolls. These means include an upper scraper blade 48 and a lower scraper blade 49 for the rolls 36 and 32, respectively, the blades extending entirely across the apparatus and contacting the respective rolls. Each blade is secured to an angle iron to which a shaft 50 is welded or equivalently secured, the shaft being journaled in lugs 51—51 projecting from the sides of the upstanding frame members 30—30. On the outer ends of the shaft links 52—52 are connected, and the links for the upper shaft are connected to the links for the lower shaft immediately therebelow by means of a tension spring 53 designed to draw the upper and lower links toward each other, thereby resiliently urging the scrapers against the respective rolls. Owing to the length of the scraper blades 48 and 49, it may be beneficial to provide a reinforcement for the blades in the central portion thereof. To this end, a rearwardly projecting bar 54 is welded or equivalently secured to the cross members between the frame parts 30—30, substantially centrally of the structure, and depending from this bar a bracket or bolt carrier 55. As seen best in Fig. 6, a bolt 56 may pass through the bracket 55 into contact with a center portion of the scraper blade 48, and a bolt 57 may likewise contact the scraper blade 49r, thus stabilizing the central portion of these blades.

The drive for the processing apparatus is best seen in Figs. 1, 2, 3 and 4, with certain structural details shown in other figures referred to later. The shaft for the aforesaid drive wheel 6 operating the mowing means extends through that wheel and is connected by a suitable telescopic shaft and universal joint assembly 58 to a bevel gear 59 and a gear box 60 mounted on the main frame. Journaled in one of the upstanding frame elements 14 and the gear box itself is a shaft 61 which carries on its inner end a bevel gear 62 receiving its drive from the aforesaid gear 59. On the outer end thereof this shaft 61 carries a drive sprocket 63 and a suitable clutch 64 manually controlled by a lever 65 establishes power engagement for the operation of the drive sprocket 63.

When the clutch is engaged, the sprocket 63 through a chain 66 drives a sprocket 67 on the shaft 33 of the lower crusher roll. As seen clearly in Fig. 4, this shaft 33 carries another sprocket 68 inside the sprocket 67 around which a tortuously disposed chain 69 is entrained. As seen in Fig. 2, the chain 69 passes in the reverse direction around a sprocket 70 on the shaft 36 of the upper crusher roll, then extends rearwardly around a tensioning sprocket 71, and then forwardly around a sprocket 72 on a stub shaft 73 journaled in an upstanding support 74 secured to the subframe 11 on one side thereof. From the sprocket 72, the chain 69 again encircles the aforesaid sprocket 68 on the lower roll shaft. The stub shaft 73 also carries an inner sprocket 75 which by way of a chain 76 drives a sprocket 77 secured to the shaft 22 of the rotary rake structure above described so as to drive the latter.

With reference now more particularly to Figs. 7 and 8, it will be noted that tension is maintained upon the roll driving chain 69 by a suitable mounting arrangement for the sprocket 71. This sprocket 71 is carried on a stub shaft 78 the journal of which is mounted on a slide member 79 which may slide backwardly and forwardly inside a channel formation 80 carried on an arm 81 projecting from the adjacent upstanding frame part 30. A compression spring 82 disposed between the slide 79 and a bolt 83 adjustably mounted in a lug 84 projecting from the arm 81 normally urges the slide 79 and sprocket 71 rearwardly to maintain the chain 69 in a taut condition. Now with reference again to Fig. 2, it will be noted that as the upper roll may move upwardly and downwardly both against and with the action of the pressure spring 42—42, the sprocket 70 pulls upon and yields to the chain 69, causing the sprocket 71 to move inwardly and outwardly against the action of the compression spring 82, proper tension being maintained at all times by that compression spring 82.

Looking now at Figs. 4 and 9, it will be noted that safety means are provided to prevent injury to the drive mechanism and other apparatus in the event the rotary rake structure strikes a rock or some other substantially unyieldable object in the ground. To this end, it will be noted that the sprocket 72 which transfers the drive to the stub shaft 73 is loosely disposed upon the shaft 73 and is urged into engagement with a slip clutch connection 83 carried in part with the sprocket 72 and in part by the sprocket 75, by means of a compression spring 84. As before stated, the sprocket 75 through its chain 76 drives the rotary rake assembly. Consequently, should that rotary rake strike an immovable object, the rotation of the rake is stopped, and rather than any injury occur to any part of the apparatus, the clutch arrangement 83 will merely slip against the action of the spring 84.

In operation, the instant invention is highly efficient and easily handled. No more trouble is experienced in operating the mowing and processing assembly than would be experienced in operating a mower alone. It will be noted from the showing in Fig. 1, that the processing means follow directly behind the tractor 1 while the cutter bar extends laterally to one side thereof, so that the tractor and processing means travel down a mowed swath while the cutting means are mowing the next adjacent swath.

While the next swath is being mowed, the rotary rake assembly above described picks up the mowed hay in the previously cut swath behind the tractor and elevates and throws that picked up hay between the crusher rolls 35 and 32. These crusher rolls crush the stems or stalks of the hay, and as it passes between the rolls, the crushed hay is permitted to fall loosely and lightly upon the ground behind the processing apparatus. The crushing of the stems or stalks of the hay enables the hay to be dried in a considerably shorter time than usual, and the loose and free disposition of the crushed hay also aids in shortening the drying time, since the hay is distributed substantially the way it would be if acted upon by a tedding machine. In most cases, with the use of the present apparatus the hay will naturally dry upon the ground in substantially half the time heretofore necessary. It will be noted especially that after the passage of the machine, none of the hay is left compacted or pressed against the ground by virtue of heavy wheels traveling thereover. After processing, the hay is left loosely upon the ground in a fluffed condition where it may easily be raked up when dry.

It will be noted that both the mowing and processing means may be handled as a single unit, both being driven from the power takeoff from the tractor, and both being joined to and removed from the tractor as a unit. Thus, only a negligible amount is added to the cost of operating the mower alone in order to obtain the processing as well. If so desired, however, the processing apparatus may be separated from the mowing means and alone connected to the tractor in alignment therewith.

It will be noted that the structure embodied in this invention is economical to manufacture and use, highly durable, and adequate precautions have been taken to avoid injury, so that the device is long lasting and economical to maintain.

My novel method of processing hay contemporaneously with the mowing of the hay is apparent from the foregoing disclosure without the need of further description herein.

It will be understood that modifications and variations may be effected without departing from the scope of the novel concepts of the present invention.

I claim as my invention:

1. In an agricultural processing machine to act on mowed hay and similar crop in combination with a tractor-mower wherein the mower blade projects laterally to cut a swath next adjacent that passed over by the tractor, a mobile frame, crop pick-up means carried by said frame, crushing means carried by said frame, and a forwardly directed centrally disposed draw-bar structure on said frame connected with the tractor directly behind the tractor, whereby the combination will cut a swath and at the same time will pick up and treat the next previously mowed swath.

2. In an agricultural processing machine to act on mowed hay and similar crop, a mobile frame having sides and at least a front portion, crop pick-up means and crushing means carried and enclosed by said frame, and a forwardly disposed drawbar structure on said front portion of said frame, said draw bar structure having means centrally thereof for connection to a tractor draw bar.

3. In an agricultural processing machine to act on mowed hay and similar crop in conjunction with a power vehicle, a mobile frame having sides and at least a front portion, crop pick-up means and crop crushing means carried and enclosed by said frame, a forwardly disposed draw-bar structure on said front portion of said frame, said draw-bar structure having means centrally thereof for connection to a power vehicle draw-bar, and caster wheels on said frame at the rear thereof for supporting said frame in alignment with a power vehicle.

4. In an agricultural processing machine to act on mowed hay and similar crop in conjunction with a power vehicle, a mobile frame having sides and at least a front portion, crop pick-up means and crop crushing means carried and enclosed by said frame, a forwardly disposed draw bar structure on said front portion of said frame, said draw bar structure having means centrally thereof arranged for rigid connection at separate points to a power vehicle draw-bar, and caster wheels at the sides and rear end of said frame to mobilely support said frame in alignment with a power vehicle.

5. In an agricultural processing machine to act on mowed hay and similar crop in conjunction with a power vehicle, a frame having sides and at least a front portion, crop pick-up means and crop crushing means carried and enclosed by said frame, a forwardly disposed draw-bar structure on said front portion of said frame, and connecting means on said draw-bar structure disposed centrally thereof arranged for pivotal connection with a power vehicle draw-bar, and wheels supporting said frame to render the same mobile.

BENJAMIN E. GETZ.

REFERENCES CITED

The following references are of record in the file of this patent:

UNITED STATES PATENTS

| Number | Name | Date |
|---|---|---|
| 1,170,616 | Dintaman | Feb. 8, 1916 |
| 1,726,535 | Bowers | Sept. 3, 1929 |
| 1,972,680 | Cushman | Sept. 4, 1934 |
| 2,114,580 | Thompson | Apr. 19, 1938 |
| 2,133,143 | Innes | Oct. 11, 1938 |
| 2,157,619 | McElwain | May 9, 1939 |
| 2,198,214 | Musher | Apr. 23, 1940 |
| 2,318,576 | Arnold | May 11, 1943 |
| 2,345,715 | Reed | Apr. 4, 1944 |
| 2,379,371 | Moschel et al. | June 26, 1945 |
| 2,430,734 | Raney et al. | Nov. 11, 1947 |